United States Patent [19]

Stieger

[11] 4,194,360

[45] Mar. 25, 1980

[54] POWER TAKE-OFF ARRANGEMENTS

[76] Inventor: Helmut J. Stieger, Langtree Lodge, Cave Rd., Brough, Humberside, England

[21] Appl. No.: 886,855

[22] Filed: Mar. 15, 1978

[30] Foreign Application Priority Data

Mar. 16, 1977 [GB] United Kingdom ............... 11036/77
Sep. 27, 1977 [GB] United Kingdom ............... 40091/77

[51] Int. Cl.$^2$ ............................................. F16D 33/00
[52] U.S. Cl. ....................................... 60/325; 60/468; 415/49; 415/53 T; 415/144
[58] Field of Search ........... 415/49, 53 T, 144, 213 T; 60/325, 330, 347, 352, 433, 449, 468, 494

[56] References Cited

U.S. PATENT DOCUMENTS 3,356,034 12/1967 Knowles et al. ........... 415/53 T UX
3,357,635 12/1967 Ullery ......................... 415/53 T UX
4,086,766 5/1978 Stieger .................................. 60/330

*Primary Examiner*—Edgar W. Geoghegan
*Attorney, Agent, or Firm*—William A. Drucker

[57] ABSTRACT

The invention relates to a power take-off arrangement, particularly a power take-off arrangement from an engine, comprising a pump including a fixed casing defining an annular liquid chamber, a rotor with a vaned annulus rotatable in said annular liquid chamber and intended to be rotated over a relatively wide speed range, a liquid inlet to said annular chamber, a liquid outlet from said annular chamber, a gate between said inlet and said outlet intended to allow passage of the rotor thereby while obstructing the flow of liquid along said annular chamber externally of the vanes of the rotor, and means for maintaining the liquid outlet from said pump at a substantially constant pressure at speeds above a predetermined speed within said speed range.

28 Claims, 14 Drawing Figures

Figure 1:
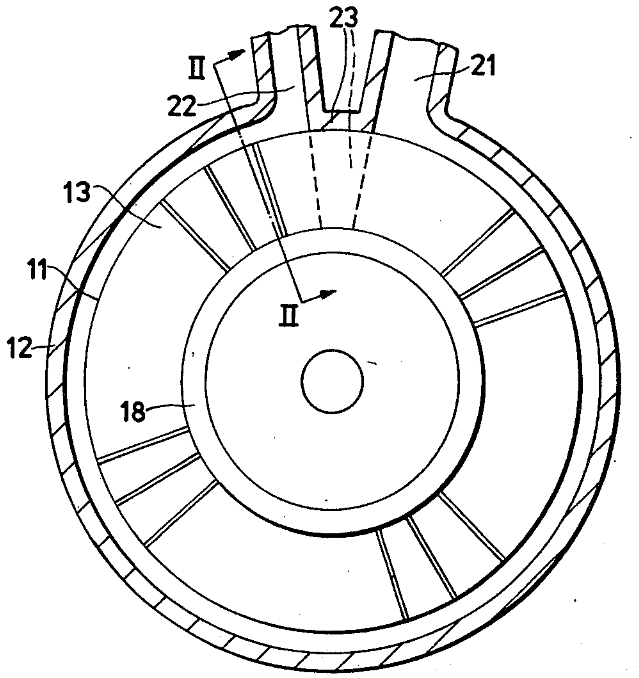

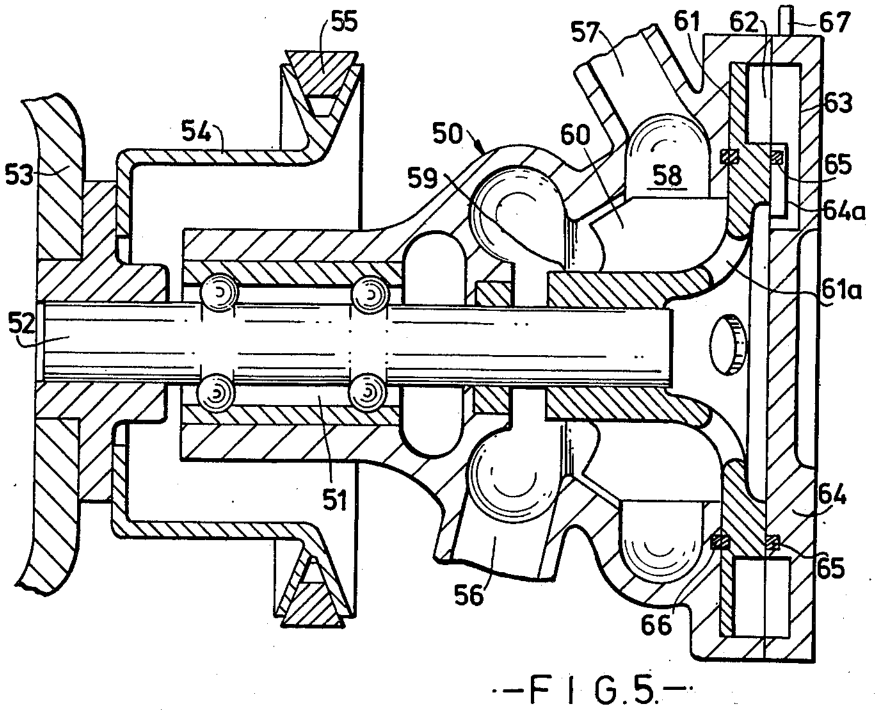
-FIG.5-
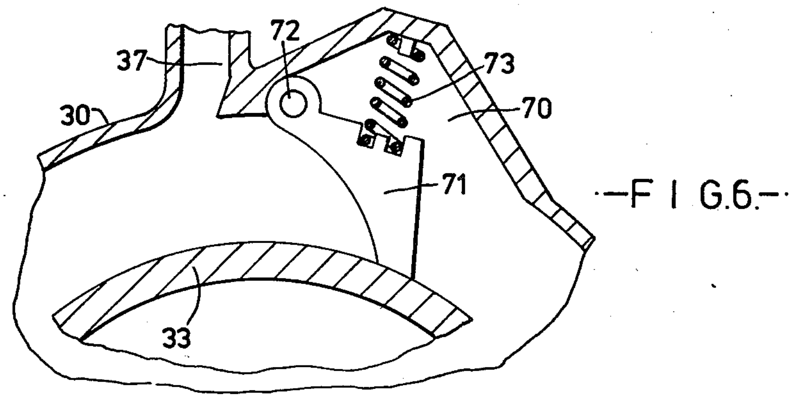
-FIG.6-
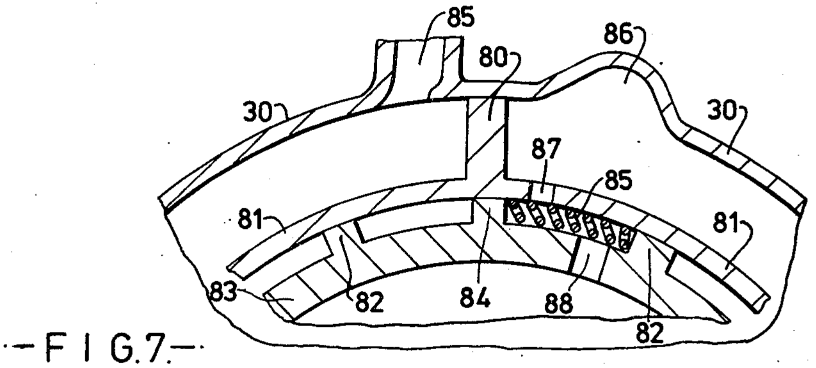
-FIG.7-

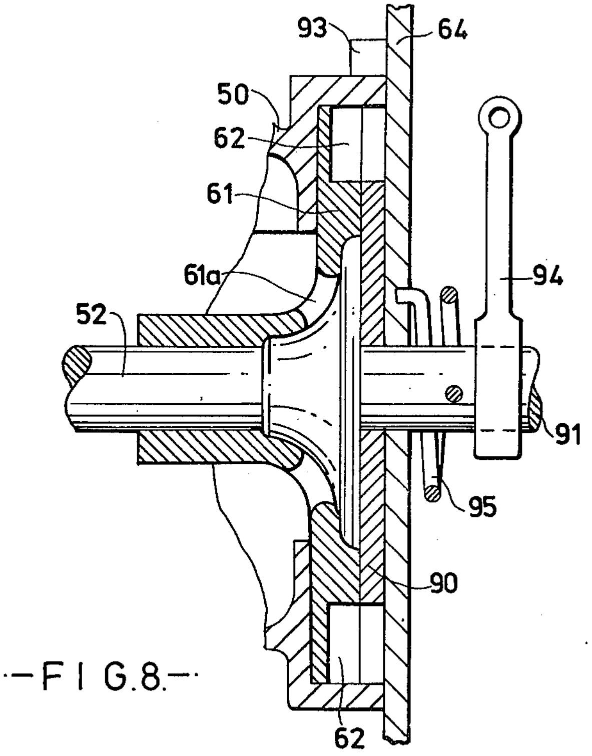
-F I G.8.-
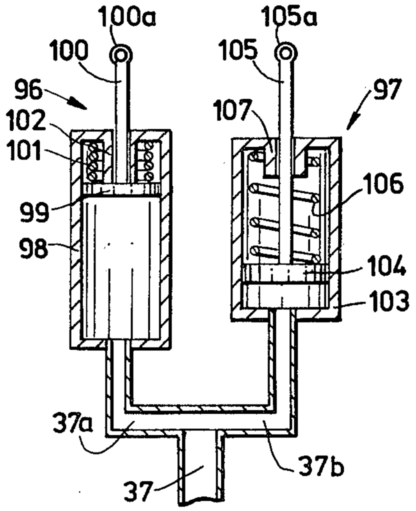
-F I G.9.-

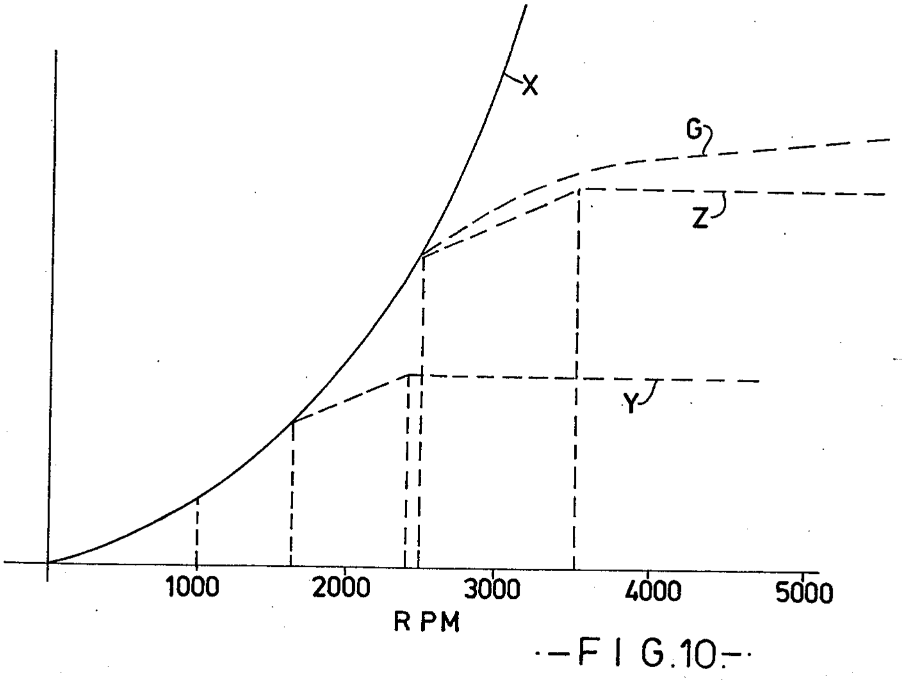
-FIG.10-
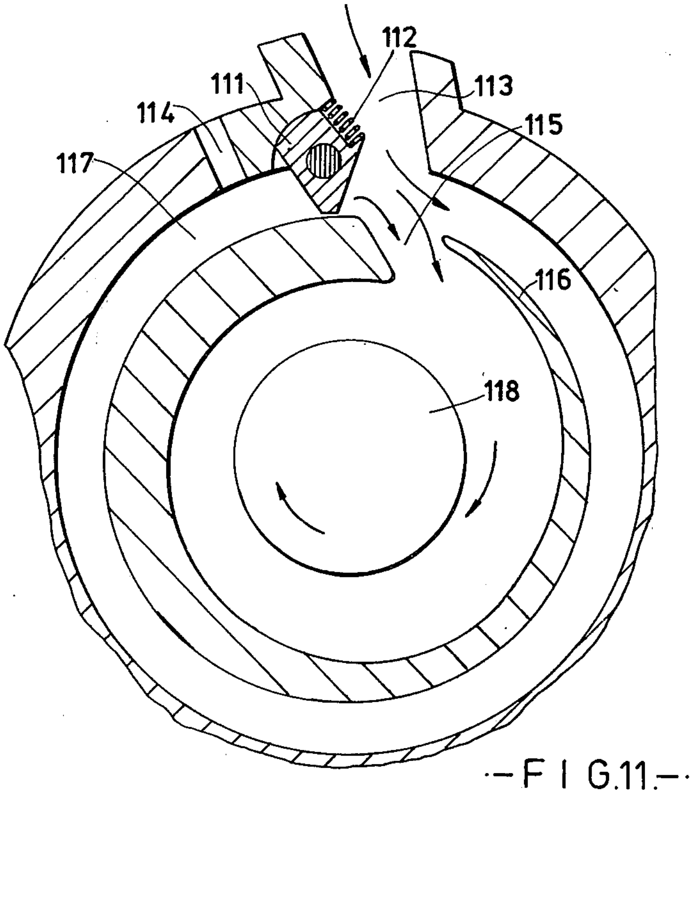
-FIG.11-

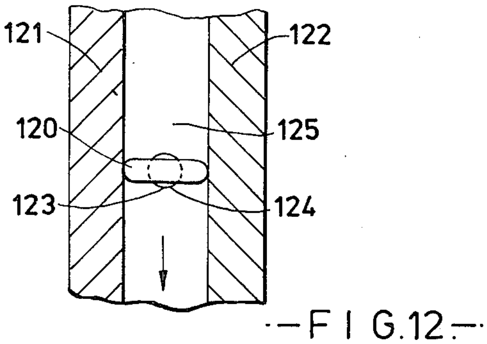
-FIG.12.-
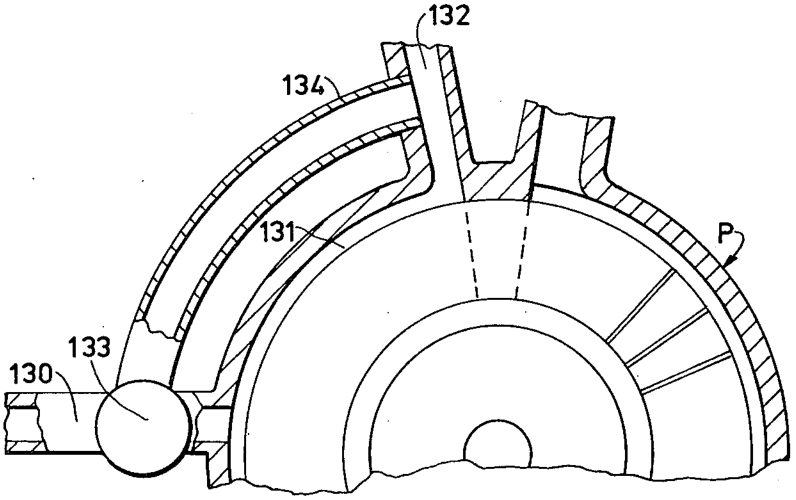
-FIG.13.-
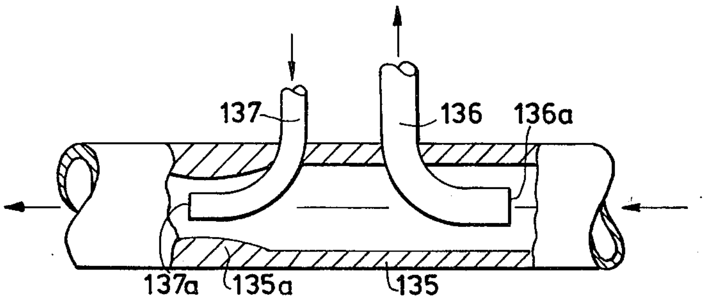
-FIG.14.-

POWER TAKE-OFF ARRANGEMENTS

This invention relates to power take-off arangements and has particular application to a power take-off arrangement for a liquid cooled engine.

Power take-off arrangements from an engine fall generally into two types (a) arrangements necessary or desirable for the continuous running of the engine and its essential ancillary apparatus, and (b) arrangements for driving apparatus not directly associated with the engine.

Examples of arrangements (a) are the conventional water pump, generator, and fan of a water cooled vehicle engine and which are generally driven by a single belt passing over a pulley on the output shaft of the engine.

Examples of arrangements (b) are power assisted brakes, power assisted steering, automatically adjustable suspension systems and/or, in the case of commercial vehicles, auxiliary power units for operating lifting apparatus, pumps, heaters, refrigerating units and the like auxiliary equipment. Such apparatus is generally powered by a take-off arrangement driven by the engine output shaft or some other rotary member downstream of the engine output shaft in the direction of drive transmission.

A difficulty with conventional power take-off arrangements is that such arrangements are driven by the engine, or drive transmission, at a speed directly related to the engine speed, the speed for a vehicle engine may vary from a tick-over speed of 500 r.p.m. to a maximum speed of the order of 6,000 r.p.m., with considerable changes in speed whilst the vehicle is on the road and, as most power take-off arrangements operate with maximum efficiency over a speed range much narrower than the engine speed range, it becomes necessary to provide cut-outs as in the case of the battery charger, or it must be accepted that the power take-off arrangements will operate with low efficiency over certain ranges of engine speed and the arrangements must be designed accordingly.

Other power operated apparatus for the vehicle, such as clutches, gear change mechanisms, brakes, and steering, as require a substantially constant power source cannot be operated in dependence upon the engine speed and conventionally such apparatus is powered by secondary power means.

An object of the present invention is to provide a power take-off arrangement including a high pressure pump capable of delivering a substantially constant liquid pressure at a power take-off outlet from the pump over a wide range of rotary speeds.

According to the present invention there is provided a power take-off arrangement comprising a high pressure liquid pump intended to be rotated over a relatively wide speed range by a power source and means for maintaining a liquid outlet from said pump at a substantially constant pressure at speeds above a predetermined speed within said speed range.

Preferably the pump comprises a fixed casing defining an annular liquid chamber, a rotor with a vaned annulus rotatable in said annular liquid chamber, a liquid inlet to said annular chamber, a liquid outlet from said annular chamber, and a gate between said inlet and said outlet intended to allow passage of the rotor thereby whilst obstructing the flow of liquid along said annular chamber externally of the vanes of the rotor.

Preferably the gate extends radially adjacent one side of that part of the rotor within the annular race chamber and, when the annular liquid chamber extends on both sides of the rotor the gate conveniently extends radially adjacent both sides of that part of the rotor within the annular liquid chamber.

Preferably the gate is displaceable relative to the casing between a first position and a second position, said gate in said first position closing the annular liquid chamber to prevent circumferential flow of liquid past the gate and in said second position permitting flow of liquid thereby.

Preferably said gate is resiliently loaded towards said first position, and conveniently is loaded by a compression spring means.

In one embodiment in accordance with the invention the gate is pivotable about an axis parallel to the rotational axis of the rotor. In another embodiment the gate is pivotable about an axis substantially at right angles to the axis of the rotor. In a still further embodiment the gate is mounted for angular displacement about the axis of the rotor and said annular liquid chamber includes an enlarged volume adjacent the second position for said gate so arranged that, when the gate is in said second position, liquid can flow through said enlarged volume past said gate.

The pump may conveniently include a valve, arranged to open when the pressure of the liquid outlet from the pump exceeds a predetermined value.

In one embodiment in accordance with the invention said valve, when opened, allows pressure liquid flow from said high pressure outlet to a liquid inlet to the pump.

In an alternative arrangement said valve, when actuated, allows pressure liquid to exhaust from the annular liquid chamber upstream from the high pressure outlet.

Preferably the arrangement includes annular sealing means between the rotor and the casing, radially inwardly of the annular chamber.

Preferably an annular liquid volume is defined between the rotor and the casing radially inwardly of the said annular sealing means and conveniently a duct connects the low pressure end of the annular chamber with said annular liquid volume.

In one embodiment in accordance with the invention said annular volume constitutes a reservoir for the annular liquid chamber.

In an alternative embodiment a low pressure liquid inlet connects to the low pressure end of the annular liquid chamber and liquid supplied in excess of that required to maintain the liquid chamber fully charged is exhausted to said annular liquid volume. With such an arrangement high pressure liquid released past the gate is ducted to increase the liquid flow from the low pressure liquid inlet to said annular liquid volume.

The said annular liquid volume may, conveniently, be in open communication with a liquid circulation system.

The invention also envisages a power take-off arrangement in combination with a power take-off device linked to the gate for displacement therewith.

In another embodiment the invention envisages a power take-off arrangement in combination with a pressure-liquid actuated power take-off device in communication with the high pressure liquid outlet from the annular liquid chamber. Such a take-off device may comprise a piston and cylinder arrangement including resilient means for urging the power take-off device to an inoperative condition. The invention also envisages a plurality of piston and cylinder arrangements each in communication with the high pressure liquid outlet for actuation when the pressure of the liquid of said outlet attains a predetermined pressure range individual to each piston and cylinder arrangement, and whereby the piston and cylinder arrangements can activate in a desired sequence.

The invention also envisages a power take-off arrangement in which the low pressure inlet for the annular liquid chamber communicates with a liquid duct of a liquid circulation system, the high pressure outlet for the annular liquid chamber communicates with said liquid duct at a location spaced from said low pressure inlet, and whereby the evacuation of liquid from the duct to the low pressure inlet and exhaust of high pressure liquid into the duct from the high pressure outlet is arranged to enforce liquid flow along said duct.

The power take-off arrangement proposed by the present invention is ideally suited to a power take-off from the engine of a motor vehicle when with the pump connected to a liquid reservoir for the engine, such as the oil sump or the water cooling system, heat generated by the pump is dissipated in the circulating liquid and, in fact, the pump and pump connections with the reservoir can effect a cooling of the liquid. Further, it will be appreciated that the pump can deliver a relatively small volume of liquid at the desired pressure or, when connected to a reservoir, a substantially constant flow of liquid at the desired pressure.

It will be appreciated that the liquid pump is capable of providing both pressure liquid as a power source and mechanical displacement as a power source simultaneously with or without ducting of pressure liquid to assist circulation of liquid in a liquid circulation system directly or indirectly associated with the power source for the pump.

Figure 2:
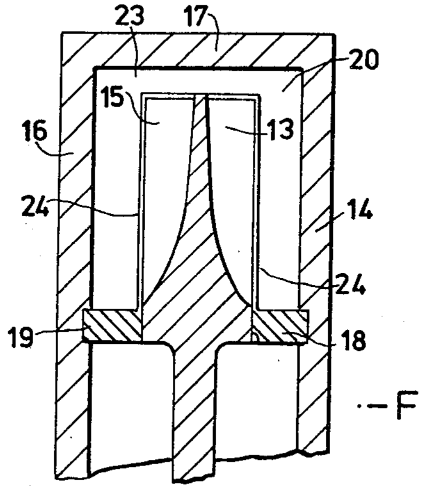
Figure 3:
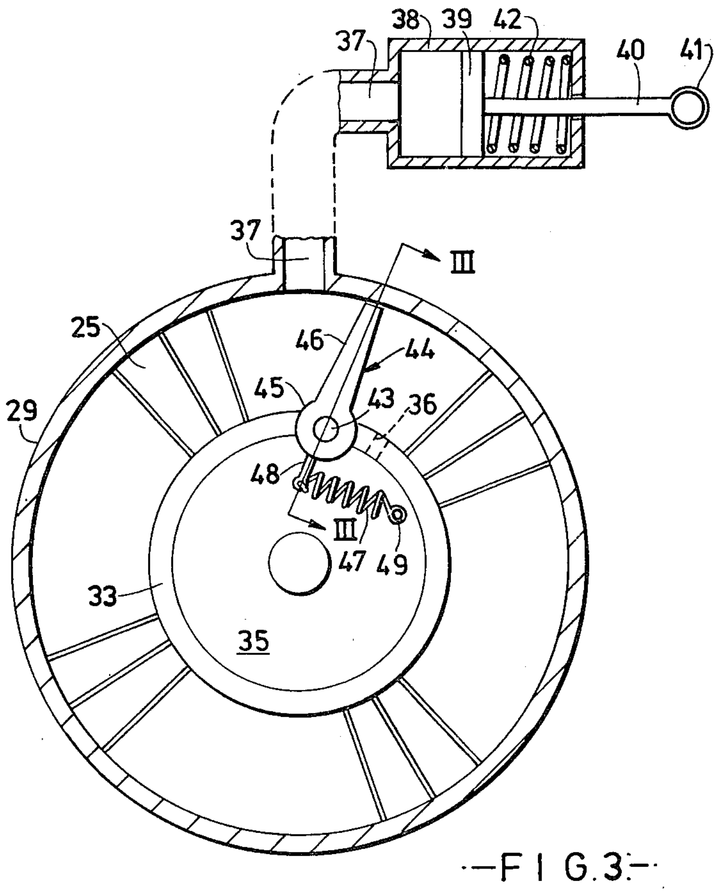
Figure 4:
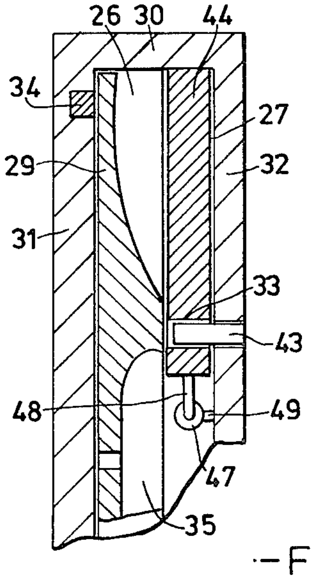

The invention will now be described further by way of example with reference to the accompanying drawings in which:

FIG. 1 shows, diagrammatically, the arrangement of a conventional vortex pump,

FIG. 2 shows a cross-section through the conventional vortex pump on the line II—II in FIG. 1, FIG. 3 shows diagrammatically, an axial view of a liquid pump in accordance with the present invention with one side of the casing removed and illustrating one form of gate arrangement, FIG. 4 shows a cross-section through the liquid pump on the line III—III in FIG. 3, FIG. 5 shows, in axial cross-section, a conventional water pump with a liquid pump in accordance with the invention formed integral therewith, FIG. 6 shows a second embodiment gate arrangement, FIG. 7 shows a third embodiment gate arrangement, FIG. 8 shows, in axial cross-section, a mechanical power take-off arrangement for the liquid pump, FIG. 9 shows, in cross-section, one arrangement for powering two operating devices from a common power take-off, FIG. 10 shows a graph illustrating the performance of the liquid pump relative to a conventional vortex pump.

FIG. 11 shows, diagrammatically, a cross-section through a further pump embodiment including a liquid circulation facility, FIG. 12 shows a radial view of a further gate embodiment, FIG. 13 shows, diagrammatically, a part cross-section through a further pump embodiment, and FIG. 14 shows, diagrammatically, and in cross-section one arrangement for effecting liquid circulation along a duct.

The vortex pump shown in FIGS. 1 and 2 comprises a rotor 11, rotatable within a fixed casing 12, and presenting a vaned annulus 13 on that radial face adjacent end wall 14 of casing 12, and a vaned annulus 15 on that radial face adjacent end wall 16 of casing 12, the vaned annulus 15 being of the same radial dimensions and, in effect, a mirror image of the annulus 13. The end walls 14 and 16 of casing 12 are axially spaced from rotor 11 and the cylindrical peripheral wall 17 of casing 12 is also spaced from rotor 11. A sealing member 18 is located in end wall 14 and engages rotor 11, radially inwardly of the vaned annulus 13, and an annular sealing member 19, located in end wall 16, engages rotor 11 radially inwardly of the vaned annulus 15. The annular regions of rotor 11 including annulus 13 and annulus 15 thus rotates in an annular chamber 20 defined by peripheral wall 17, walls 14 and 16 and sealing members 18 and 19.

The casing 12 also includes a liquid inlet 21 and a liquid outlet 22, and a gate 23 which closes the chamber 20 between inlet 21 and outlet 22 leaving only a slot 24 through which rotor 11 passes. Gate 23 thus obstructs liquid flow peripherally outwardly of rotor 11 between outlet 22 and inlet 21.

When the casing 12 radially outwardly of sealing members 18 and 19 is charged with liquid via the inlet 21 and the rotor 11 is rotated clockwise (as viewed in FIG. 1) the rotating vaned annulus 13 and vaned annulus 15 work on the liquid in chamber 20 to create a pressure gradient in the liquid extending from a low pressure end adjacent inlet 21 circumferentially in the direction of rotation of rotor 11 to a high pressure end adjacent outlet 22.

The vortex pump described above is well known in the art and the theory of the liquid working between the vortex blades to establish the circumferential pressure difference is also well known and understood in the art. A difficulty with this type of pump is that the pressure gradient is dependent upon the rotational speed of the rotor, increase of rotor speed results in an increased pressure difference along the liquid path, and a uniform pressure take-off can only be obtained by rotating the rotor at substantially uniform speed.

The liquid pump illustrated in FIGS. 3 and 4 is intended to operate in a manner similar to the vortex pump system previously discussed, to establish a pressure difference in an annular liquid chamber circumferentially of the chamber.

The pump comprises a rotor 25 with a vaned annulus 26 on one radial face 27, the other radial face 28 being substantially plane. The rotor 25 rotates within a casing 29 and which comprises a cylindrical wall 30, closely approaching the periphery of rotor 25, an end wall 31 in close relationship with radial face 28 of rotor 25 and an end wall 32 spaced from radial face 27 of rotor 25. The end wall 32 presents an annular sealing member 33 in sliding, but sealing, engagement with rotor 25, radially inwardly of the vaned annulus 26 and end wall 31 presents an annular sealing member 34 in sealing engagement with the face 28 adjacent the periphery thereof. Thus, by the above construction, the casing 29 provides an annular liquid chamber radially between sealing member 33 and wall 30, closed at one side by wall 32 and on the other side by the vaned annulus 26 of rotor 25. Radially inwardly of sealing member 33 the casing 29 and rotor 25 define an annular chamber 35 which communicates with the annular liquid chamber via a duct 36 which passes through the sealing member 33.

The casing 29 has a pressure liquid take-off, defined by a duct 37 opening into the annular liquid chamber, and duct 37 communicates with a powering source, illustrated in the FIG. 3 embodiment as a piston and cylinder arrangement, comprising a cylinder 38 with a sliding piston 39 therein. Duct 37 opens into one end of cylinder 38, and the piston 39 includes a piston rod 40 which extends through the other end wall of the cylinder to define a power point 41 at its external end. A coil compression spring 42 located in cylinder 38 between piston 39 and the piston rod end of cylinder 38 exerts a force on piston 39 urging said piston 39 towards the liquid supply end of cylinder 38.

The wall 32 also presents a pivot pin 43, parallel to the rotational axis of rotor 25, and upon which pin 43 a gate, generally indicated by reference numeral 44, is pivotally supported.

The gate 44 comprises a boss 45, through which the pin 43 passes, a radial arm 46, the sealing member 33 is broken to allow boss 45 to enter between the broken ends thereof and the broken ends of sealing member 33 bear on the boss 45 to reduce, or eliminate, liquid leakage from the annular liquid chamber. The radial arm 46 extends from boss 45 to engage the internal surface of wall 30 thereby to close the annular liquid chamber between wall 30, sealing member 33, wall 32 and the radial face 27 of rotor 25. The gate 44 can rotate clockwise (as viewed in FIG. 3) from its closure condition but is resiliently urged to its closure condition by a coil tension spring 47 acting between a pin 48 secured to boss 45 and an anchor pin 49 presented by wall 32.

Thus, in the closure condition, the gate 44 allows the rotor 25 to pass thereby whilst obstructing the free flow of liquid within the annular liquid chamber externally of the rotor 25.

It will be observed that the gate 44 closes the annular liquid chamber close to, but clockwise of, the pressure take-off duct 37 (as viewed in FIG. 3) and, the duct 36 opens to the annular liquid chamber clockwise of the boss 45.

The liquid pump described above operates as follows:

That end of cylinder 38 opening to duct 37, the duct 37, the annular liquid chamber, and volume 35 are charged with liquid and conveniently the volume 35 communicates with a liquid reservoir, thus to totally exclude air from the system. When the rotor 25 starts to rotate clockwise, as viewed in FIG. 3, the vaned annulus 26 works on the liquid in the annular liquid chamber and the gate 44 is in its closure condition obstructing free flow of liquid thereby to establish a pressure difference circumferentially of the annular chamber with the low pressure end adjacent the right hand side of the gate 44 (as viewed in FIG. 3) and the high pressure side on the left hand face of the gate 44. The circumferential pressure difference increases in direct relationship to the rotational speed of the rotor 25 and as the pressure difference increases the liquid pressure in duct 37, and thereby in the communicating end of cylinder 38, increases to deflect piston 39 against the action of spring 42. As piston 39 is displaced pressure liquid flows from the annular chamber along duct 37 to cylinder 38 to make up the difference in volume created by displacement of piston 39, and low pressure liquid flows into the low pressure end of the annular chamber from the volumes 35 via duct 36 to make up the liquid loss from the annular chamber. As the piston 39 displaces (as viewed in FIG. 3) power is transmitted via the piston rod 40 to the power take-off 41 to work the desired ancillary apparatus.

When now the liquid in cylinder 38 has deflected piston 39 by the desired amount and the rotational speed of the rotor 25 is increased the increase in the pressure difference across the gate 44 causes said gate 44 to be rotated clockwise (as viewed in FIG. 3) against the action of spring 47 and whereby, as said gate 44 displaces from the closure condition illustrated in FIG. 3, liquid can flow from the high pressure end of the annular chamber past the deflected gate 44 into the low pressure end of the annular liquid chamber, thereby preventing increase in the circumferential pressure difference in the annular chamber. The actual amount of deflection of the gate 44 from its closure condition will depend upon the actual pressure differences across the gate in excess of that required to maintain the piston 39 in the desired position within cylinder 38 and thus once the gate 44 displaces from its closure condition, and with the spring 47 urging gate 44 towards a closure condition, a substantially uniform pressure gradient is established in the annular liquid chamber independent of the rotational speed of the rotor 25.

As the rotational speed of the rotor 25 reduces, the effect of the vaned annulus 26 on the liquid in the annular chamber reduces until the pressure gradient developed by the rotor 25 falls below the pressure difference necessary to maintain the gate 44 in the open condition and whereby the spring 47 acting on the gate 44 closes the gate 44 thereby terminating liquid flow past the gate location.

If now the rotational speed of rotor 25 falls below the speed at which the high pressure end of the annular chamber is below the desired power take-off pressure (determined by the rate of spring 42) spring 42 displaces the piston 39 towards the pressure liquid end of cylinder 38, forcing pressure liquid back through the take-off duct 37 into the annular liquid chamber and, with this operation, low pressure fluid at the low pressure end of the annular chamber flows back through the bore 36 into the volume 35.

It will be appreciated that for the embodiment illustrated in FIGS. 3 and 4 the piston and cylinder arrangement 38, 39, 40 may be arranged to afford power operation for any desired ancillary apparatus and, the stroke of piston 39 and the length and compression rate of the spring 42 are so selected that the piston 39 will be maintained in a desired position, to afford the necessary powered operation for the ancillary equipment, at a predetermined liquid pressure in cylinder 38. The length and extension rate of spring 47 can then be selected to allow the gate 44 to open when the desired pressure for cylinder 38 is obtained.

It will also be appreciated that, by carefully selecting the characteristics of spring 47, the gate 44 can be opened at any desired rotational speed of the rotor 25, for example, the gate 44 may be adapted to open and remain open when the rotational speed of rotor 25 is directly related to an engine speed of 1000 rpm, the high pressure end of the annular chamber will thereby be maintained at a substantially constant pressure through the whole range of the engine speed in excess of 1000 rpm and, the piston and cylinder arrangement can be designed to afford the desired stroke and force necessary to operate any desired ancillary apparatus at the cut-off speed e.g. 1000 rpm.

It will also be appreciated that, subject to the volume 35 being connectable to an adequate liquid reservoir such as the sump of an engine driving the rotor, the power take-off duct 37 may include branches, each having an individual powering arrangement associated therewith, such as the piston and cylinder arrangement 38, 39, 40 and 41 as hereinafter described with reference to FIG. 9, each powering arrangement may be adapted to operate a different piece of ancillary apparatus and, of course, by varying the cylinder diameters and, by careful selection of the characteristics of springs 42, different strokes and forces for the power output apparatus can be obtained from the basic pressure liquid duct 37.

It will also be appreciated that, instead of having a number of branch lines from the power output duct 37, a plurality of liquid pumps, in accordance with the invention, can be arranged on a common axis for drive by a common shaft and different operational pressures for the different liquid pumps can be obtained by having rotors of different diameters or by simply having springs 47 of different tension ratings.

It will also be appreciated that each and every powering arrangement, actuated by pressure liquid from the pump outlet, must operate below the maximum pressure that can be developed by the pump and preferably before the gate displaces from its position of maximum closure of the annular chamber. In the event that a powering arrangement is to operate a servo-system normally operating at a higher pressure than the maximum pressure derived from the pump the master cylinder for the servo-system may conveniently comprise that end of cylinder 38 including the piston rod 40 and the diameter of the cylinder 38 relative to the diameter of rod 40 can be so selected as to afford the desired pressure increase in the servo-system.

FIG. 5 illustrates, in cross-section, a liquid pump in accordance with the invention forming part of the conventional water pump for the water cooling system for the engine and thus the fixed casing 50, fixed relative to the engine block, presents a bearing 51 for a shaft 52 upon which a fan 53 and a pulley 54 are secured. The pulley 54 is engaged by a V-belt 55, driven by a pulley on an output shaft from the engine (not shown) to rotate pulley 54, fan 53, and shaft 52. The casing 50 includes an inlet duct 56, an outlet duct 57, and a water chamber 58, connecting inlet 56 with outlet 57. A boss 59, secured on shaft 52, presents conventional vanes 60 for driving the water through the water chamber 58 from inlet 56 to outlet 57 but, the boss 59 further includes an annular flange 61 presenting, in a peripheral region, a vaned annulus 62. An annular liquid chamber 63, formed in a fixed part of a casing 64, aligns with the vaned annulus 62 and annular sealing members 65 and 66 prevent liquid flow radially inwardly from the liquid chamber defined by vaned annulus 62 and annular chamber 63 without obstructing the rotation of the flange 61 relative to casing 50.

The annular liquid chamber 63 includes a power take-off duct 67 similar to the duct 37 shown in FIG. 3, and a gate (not shown) similar to the gate 44 and spring loaded, in identical way to displace between a closed condition and an open condition, whereby in like manner to the embodiment shown in FIGS. 3 and 4, the gate 44 will close whilst the shaft 52 is rotating below a predetermined speed and the gate will open when the rotational speed of shaft 52 rises above said predetermined speed. The point to observe in this embodiment is that the volume between flange 61 and the casing part 64 communicates with the cooling water system via openings 61*a* through flange 61 so that said volume links with the conventional water cooling system and this volume comprises the reservoir in open communication with the low pressure end of the annular liquid chamber via duct 64*a* through casing member 64. By linking the liquid in the liquid pump with the conventional water cooling system a ready reservoir for the pump is obtained and flow of liquid between the pump and the conventional water system affords cooling for the liquid pump.

FIG. 6 shows an alternative arrangement for the gate 44 shown in FIG. 3 and wherein, clockwise of the opening to duct 37 (assuming that the rotor is to rotate clockwise as viewed in FIGS. 3 and 6) the cylindrical wall 30 of the casing 29 deflects outwardly to form a chamber 70. The gate 71 is pivoted about a pivot pin 72 located at the left hand end of the chamber 70 (as viewed in FIG. 6) and the gate 71 comprises a member shaped to enter the chamber 70 when displaced from the closed position. The free end of gate 71 rests on the sealing member 33 when the gate 71 is in the closure condition illustrated in FIG. 6 and thus gate 71 effectively obstructs the free flow of liquid circumferentially past the gate position.

The gate 71 is urged towards its closure condition by gravity (when the gate 71 is located in the position shown in FIG. 6) and by a spring 73 acting between gate 71 and the roof portion of the chamber 70.

In operation, with the rotor rotating at a speed below the predetermined speed, the spring 73 and gravity maintained gate 71 in its closure condition, obstruct the flow of liquid circumferentially past the gate position. When the rotational speed of the rotor attains and exceeds the predetermined speed, dependent upon the weight of gate 71 and the rate of spring 73, the pressure difference in the liquid acting across the gate causes the gate to be rotated anti-clockwise (as viewed in FIG. 6) to permit flow of liquid from the high pressure end of the annular chamber to the low pressure end thereof and as the liquid flow increases, with increased rotation of rotor 25, the gate 71 displaces, against the action of spring 73, further into the chamber 70 to reduce the resistance to flow.

The arrangement shown in FIG. 7 shows a further gate arrangement wherein the gate 80 is radially outstanding from an annular member 81 rotatably supported on lugs 82 outstanding from sealing member 83. The member 81 presents a radially inwardly directed lug 84 and a coil compression spring 85 acts between lug 84 and lug 82 to resist clockwise rotation of member 81 from the position shown in FIG. 7 and wherein gate 80 lies between take-off duct 85 and a radial chamber 86 in the peripheral wall 30 of the casing. As the pressure difference across the gate 80 increases member 81 rotates clockwise, compressing spring 85, until the gate 80 enters the radial position where liquid can flow through the chamber 86 over the gate 80. As the pressure difference reduces the spring 85 returns the member 81 toward the position shown in FIG. 7.

The liquid supply to the low pressure end of the annular chamber (assumed to be to the right of gate 80 as viewed in FIG. 7), is by way of a duct 87 in member 81 and a duct 88 through sealing member 83.

The embodiment illustrated in FIG. 8 shows a modified form of water pump arrangement to obtain a mechanical power take-off and thus, in identical manner to FIG. 5, the arrangement includes a casing 50, and an annular flange 61 presenting a vaned annulus 62. However, in the FIG. 8 embodiment, the gate (not shown) is mounted on a disc-like member 90 secured on a shaft 91 which passes through casing 64 and is rotatably supported by casing 64 co-axially with shaft 52. The casing presents a plane internal face and the annular liquid chamber is thereby defined by the vaned annulus 62, casing 50, and plane internal face of casing 64 radially outwardly of the annular member 90 (excluding the gate). The gate is fixed relative to the annular member 90 and, in like manner to casing 30 as in the FIG. 7 embodiment and the casing 50 includes an internal chamber, in a radially outstanding part of casing 50 identified by reference numeral 93.

The shaft 91 has a radial arm 94 secured thereon the free end of which defines the power take-off connection for the ancillary equipment and a coil spring 95 acts between the shaft 91 and casing 64 to urge the annular member 90 to an angular position where the gate is in its closure condition. It will be appreciated that in the embodiment shown in FIG. 8 annular sealing means are provided between casing 50 and flange 61, between flange 61 and annular member 90, and between annular 90 and casing 64 and further a duct (not shown) connects the low pressure end of the annular liquid chamber with the reservoir internally of flange 61.

The arrangement illustrated in FIG. 8 operates as follows.

When the shaft 52 is stationary, or rotating at low speed, whereby the pressure difference across the gate is small the resistance to spring 95 is small and spring 95 maintains annular member 90 in that angular position where the gate closes the annular liquid chamber. With the annular member 90 in this position radial arm 94 is ineffective on the ancillary equipment. As the rotational speed of shaft 52 and flange 61 increases, the pressure difference across the gate increases, and the member 90 is angularly displaced against spring 95, tensioning spring 95, and displacing arm 94 towards its ancillary equipment operating position until, when the member 90 has been so angularly displaced that the arm 94 is in its operative position, the gate alignes with the chamber 93 and liquid flow over the gate from the high pressure end of the annular liquid chamber takes place, whereby further pressure build-up is avoided and the arm 94 is maintained in its operative position.

When the rotational speed of shaft 52 falls the pressure difference across the gate is reduced and the coil spring 95 extends to displace member 90 towards the gate closure position, the radial arm 94 being displaced to its inoperative position.

In the arrangement shown in FIG. 9 the power take-off duct 37 includes branch lines 37*a* and 37*b* which supply pressure liquid to a first operating device 96 and a second operating device 97 respectively.

The power take-off device 96 comprises a cylinder 98, into the lower end of which (as viewed in FIG. 9) the duct 37*a* opens, a piston 99 is slidable in cylinder 98, a piston rod 100 extends through the cylinder end remote from the duct 37*a*, and a coil return spring 101 acts between the cylinder rod end of cylinder 98 and the piston 99. The end of cylinder 98 having the piston rod 100 passing therethrough also presents an axially extending cylindrical portion 102 which limits the stroke of piston 99 within cylinder 98. The piston rod 100 carries, on its free end, a power transmission point 100*a*.

In like manner the device 97 includes a cylinder 103 into which one end of the duct 37*b* opens, a piston 104 with a piston rod 105 extending therefrom extends through the end of cylinder 103 remote from duct 37*b*, and a coil return spring 106 is positioned between the end of cylinder 103 remote from duct 37*a* and the piston 104. Piston rod 105 carries on its free end, a power take-off point 105*a* and, in like manner to cylinder 98, the cylinder 103 presents an axially extending cylindrical portion 107 which limits the stroke of piston 104. It will be observed that the cylinder 103 has a greater internal diameter than the cylinder 98 and the return spring 106 has a greater strength than the spring 101.

With the above arrangement, and with pressure liquid delivered to duct 37 and branches 37*a* and 37*b* at increasing pressure, the piston 99 is driven upwardly in cylinder 98, against the action of return spring 101, before piston 104 is deflected and thus the device 96 can be fully operated, to work its ancillary equipment through power take-off point 100*a* before the device 97 operates. As the liquid pressure supplied via duct 37 to branch lines 37*a* and 37*b* increases further displacement of piston 99 is resisted by the cylindrical extension 102 of cylinder 98 and, as the liquid pressure approaches the maximum pressure at which the gate can remain in its closure position, said liquid pressure overcomes the resistance of spring 106 to permit piston 104 to be so upwardly deflected in cylinder 103 as to effect operation of the ancillary equipment by the connection with power take-off point 105*a*.

As the liquid pressure falls from the gate deflecting pressure the spring 106 will first extend to drive piston 104 to its lower position, thus deactivating the ancillary apparatus connected to power take-off point 105*a*, but device 96 will remain operational until the liquid pressure is further reduced to a pressure at which spring 101 can extend to drive liquid out of cylinder 98 and thereby the ancillary apparatus connected to power take-off 100*a* is deactivated.

The graph shown in FIG. 10 illustrates the operation of a liquid pump driving the power take-off devices of the type shown in FIG. 9 relative to a conventional vortex pump.

The pressure difference across the gate for a conventional vortex pump is shown by the full line X in FIG. 10 and it will be noted that the pressure difference progressively increases with increase in the rotational speed of the rotor.

The broken line Y indicates the pressure requirement to operate the device 96 of FIG. 9 and whereby the initiation of the device takes place at a speed of some 1600 r.p.m. and the device progressively operates until piston 99 engages extension 102 at some 2600 r.p.m. whereupon further increases in pressure are ineffective on device 96.

The broken line Z indicates the pressure requirement to operate the device 97 of FIG. 9 and whereby the initiation of the device takes place at a speed of some 2500 r.p.m., the piston 104 engages the extension 107 at some 3500 r.p.m. and, thereafter, the increase in pressure is ineffective on device 97.

The broken line G indicates the pressure difference at which the gate displaces from its closure position and the pressure differences acting across the gate throughout an engine speed of some 5000 r.p.m.

FIG. 11 shows a pump construction having an 'automatic' gate 111 controlled by a spring 112 with a relatively large liquid inlet 113 (large relative to the high pressure liquid outlet 114) and an opening 115 through the axial wall 116 defining the inner wall of the race chamber 117. The wall 116 has a thickness which increases from the opening 115 in the direction of liquid flow from the pump and the casing includes an axial outlet bore 118.

With this arrangement the inlet 112 connects with a liquid cooling arrangement for the engine e.g. the water cooling system, so that as the rotor (not shown) rotates, water is drawn into the pump from the water cooling system, some of the water enters the race chamber 117 as required and the remaining water passes through the opening 115 and the exhausts through the outlet bore 118.

When the gate 111 is closed the water circulating from inlet 113 to bore 118 is almost exclusively dependent upon the rotation of the rotor but, as the desired pressure at outlet 114 attains the desired pressure and gate 111 opens to allow high pressure liquid to pass thereby to maintain the pressure at outlet 114 substantially constant, the stream of high pressure liquid bypassing gate 111 is directed through the opening 115 to increase the rate of flow of cooling water through the pump. The pump illustrated in FIG. 11 may supplement the conventional cooling water pump or, in some cases, replace the conventional pump.

FIG. 12 shows a further embodiment in which a gate 120 is rotatable about an axis radial with respect to the pump. The gate 120, shown in the closure condition to obstruct liquid flow along the race chamber between casing 121 and rotor 122, has pivot pin ends 123 rotatable in a bore 124 in the inner radial wall 125 of the race chamber and the outer radial wall of the casing (not shown).

It will be seen that with the FIG. 12 embodiment a "balanced" gate is obtained and the gate position can be adjusted with relatively low external force.

The arrangement illustrated in FIG. 13 shows a means for modifying a conventional vortex pump to a pump according to the invention and, as will be seen from FIG. 13 a duct 130 opens to the race chamber 131, some 90° from outlet 132 of the pump P, and a pressure sensitive valve 133 is provided in duct 130. The valve 133 connects, via a duct 134 with the outlet duct.

With this arrangement, the valve 133 remains closed until the pressure in outlet 132 reaches the predetermined pressure when the valve 133, exposed to the predetermined pressure at outlet 132 via duct 134, opens to tap off pressure liquid from the race chamber 131. The loss of liquid from the race chamber into duct 130 reduces the pressure at the high pressure end of the race chamber 131 and thus, again, a substantially uniform liquid pressure can be obtained at outlet 132 irrespective of the rotational speed of the rotor above that at which the predetermined pressure is attained and valve 133 opens duct 130.

FIG. 14 shows one arrangement whereby a liquid pump according to the invention can effect circulation of liquid along a duct 135, which may conveniently form part of a liquid cooling or heating system, such as the water cooling system for the engine.

In the FIG. 14 embodiment a liquid pump inlet duct 136 and a liquid pump outlet duct 137 each pass through the wall of duct 135 and the ducts 136 and 137 are bent to present their open ends 136*a* and 137*a* respectively directed away from one another. When the pump is operating, liquid is drawn from duct 135 via duct 136 and released into duct 135 from duct 137 as a high pressure stream directed in the intended direction of flow and, by these means, an effective flow of liquid along duct 135 is obtained.

The duct 135 may include a bore restriction 135*a* in the region of the high pressure stream issuing from duct 137 to increase the velocity flow of the liquid along duct 135.

I claim:

1. A power take-off arrangement comprising a high pressure liquid pump intended to be rotated over a relatively wide speed range by a power source and means for maintaining a liquid outlet from said pump at a substantially constant pressure at speeds above a predetermined speed within said speed range, wherein the pump comprises a fixed casing defining an annular liquid chamber, a rotor with a vaned annulus rotatable in said annular liquid chamber, a liquid inlet to said annular chamber, a liquid outlet from said annular chamber, and a gate between said inlet and said outlet intended to allow passage of the rotor thereby whilst obstructing the flow of liquid along said annular chamber externally of the vanes of the rotor.

2. A power take-off arrangement according to claim 1 in which the gate extends radially adjacent one side of that part of the rotor within the annular race chamber.

3. A power take-off arrangement according to claim 1 in which the gate extends radially adjacent both sides of that part of the rotor within the annular liquid chamber.

4. A power take-off arrangement comprising a high pressure liquid pump incluing a fixed casing defining an annular liquid chamber, a rotor with a vaned annulus rotatable in said annular liquid chamber and intended to be rotated over a relatively wide speed range by a power source, a liquid inlet to said annular chamber, a liquid outlet from said annular chamber, and a gate between said inlet and said outlet intended to allow passage of the rotor thereby whilst obstructing the flow of liquid along said annular chamber externally of the vanes of the rotor, said gate being displaceable relative to the casing in response to a predetermined pressure difference across said gate to maintain the liquid outlet from said pump at a substantially constant pressure at speeds above a predetermined speed within said speed range.

5. A power take-off arrangement according to claim 4 in which the gate extends radially adjacent one side of that part of the rotor within the annular race chamber.

6. The power take-off arrangement according to claim 4 in which the gate extends radially adjacent both sides of that part of the rotor within the annular liquid chamber.

7. A power take-off arrangement according to claim 4 in which the gate is displaceable relative to the casing between a first position and a second position, said gate in said first position closing the annular liquid chamber to prevent circumferential flow of liquid past the gate and in said second position permitting flow of liquid circumferentially thereby.

8. A power take-off arrangement as claimed in claim 4 in which said gate is resiliently loaded towards its position affording maximum obstruction to liquid flow thereby.

9. A power take-off arrangement according to claim 4 in which the gate is pivotable about an axis parallel to the rotational axis of the rotor.

10. A power take-off arrangement according to claim 4 in which the gate is pivotable about an axis substantially at right angles to the axis of the rotor.

11. A power take-off arrangement according to claim 4 in which the gate is mounted for angular displacement about the axis of the rotor and said annular liquid chamber includes an enlarged volume adjacent the second position for said gate so arranged that, when the gate is in said second position, liquid can flow through said enlarged volume past said gate.

12. A power take-off arrangement comprising a high pressure liquid pump including a fixed casing defining an annular liquid chamber, a rotor with a vaned annulus rotatable in said annular liquid chamber and, intended to be rotated over a relatively wide speed range by a power source, a liquid inlet to said annular chamber, a liquid outlet from said annular chamber, a gate between said inlet and said outlet intended to allow passage of the rotor thereby whilst obstructing the flow of liquid along said annular chamber externally of the vanes of the rotor and valve means for maintaining a liquid outlet from said pump at a substantially constant pressure at speeds above a predetermined speed within said speed range.

13. A power take-off arrangement according to claim 12 in which said valve means comprise a valve, arranged to open when the pressure of the liquid outlet from the pump exceeds a predetermined value to allow pressure liqid flow from said high pressure outlet to a liquid inlet to the pump.

14. A power take-off arrangement according to claim 12 in which said valve, when actuated, allows pressure liquid to exhaust from the annular liquid chamber upstream from the high pressure outlet.

15. A power take-off arrangment comprising a high pressure liquid pump including a fixed casing defining an annular liquid chamber, a rotor with a vaned annulus rotatable in said annular liquid chamber and intended to be rotated over a relatively wide speed range by a power source, a liquid inlet to said annular chamber, a liquid outlet from said annular chamber, a gate between said inlet and said outlet intended to allow passage of the rotor thereby whilst obstructing the flow of liquid along said annular chamber externally of the vanes of the rotor means for maintaining a liquid outlet from said pump at a substantially constant pressure at speeds above a predetermined speed within said speed range and including annular sealing means between the rotor and the casing radially inwardly of the annular chamber and defining an annular liquid volume between the rotor and the casing radially inwardly of the said annular sealing means.

16. A power take-off arrangement according to claim 15 in which said liquid inlet comprises a duct connecting the low pressure end of the annular chamber with said annular liquid volume, and whereby said annular volume constitutes a reservoir for the annular liquid chamber.

17. A power take-off arrangement according to claim 15 in which a duct connects the low pressure end of the annular chamber with said annular volume, the liquid inlet connects to the low pressure end of the annular liquid chamber and liquid supplied by said liquid inlet in excess of that required to maintain the annular chamber fully charged with liquid is exhausted to said annular liquid volume via said duct.

18. A power take-off arrangement according to claim 15 in which a duct connects the low pressure end of the annular chamber with said annular liquid volume and high pressure liquid from said liquid outlet is ducted to increase the liquid flow from the low pressure liquid inlet to said annular liquid volume.

19. A power take-off arrangement according to claim 15, in which said annular liquid volume is in open communication with a liquid circulation system.

20. A power take-off arrangement according to claim 4 in combination with a power take-off device linked to the gate for displacement therewith.

21. A power take-off arrangement according to claim 4 in combination with a high pressure liquid outlet from the annular liquid chamber.

22. The combination set forth in claim 21 and wherein the power take-off device comprises a piston and cylinder arrangement including resilient means for urging the power take-off device to an inoperative condition.

23. The combination set forth in claim 22 and wherein a plurality of piston and cylinder arrangements are in communication with the high pressure liquid outlet for actuation when the pressure of the liquid at said outlet attains a predetermined pressure range individual to each piston and cylinder arrangement and whereby the piston and cylinder arrangements can activate in a desired sequence.

24. A power take-off arrangement according to claim 4 in which the low pressure inlet for the annular liquid chamber communicates with a liquid duct of a liquid circulation system, the high pressure outlet for the annular liquid chamber communicates with said liquid duct at a location spaced from said low pressure inlet and whereby the evacuation of liquid from the duct to the low pressure inlet and exhaust of high pressure liquid into the duct from the high pressure outlet is arranged to enforce liquid flow along said duct.

25. A power take-off arrangement according to claim 12 in combination with a pressure-liquid actuated power take-off device in communication with the high pressure liquid outlet from the annular liquid chamber.

26. The combination set forth in claim 25 in which the power take-off device comprises a piston and cylinder arrangement including resilient means for urging the power take-off device to an inoperative condition.

27. The combination set forth in claim 25 and wherein a plurality of piston and cylinder arrangements are in communication with the high pressure liquid outlet for actuation when the pressure of the liquid of said outlet attains a predetermined pressure range individual to each piston and cylinder arrangement and whereby the piston and cylinder arrangements can activate in a desired sequence.

28. A power take-off arrangement according to claim 12 in which the low pressure inlet for the annular liquid chamber communicates with a liquid duct of a liquid circulation system, the high pressure outlet for the annular liquid chamber communicates with said liquid duct at a location spaced from said low pressure inlet and whereby the evacuation of liquid from the duct to the low pressure inlet and exhaust of high pressure liquid into the duct from the high pressure outlet is arranged to enforce liquid flow along said duct.

* * * * *